E. H. SNYDER.
VALVE.
APPLICATION FILED APR. 2, 1917.
1,250,041.
Patented Dec. 11, 1917.
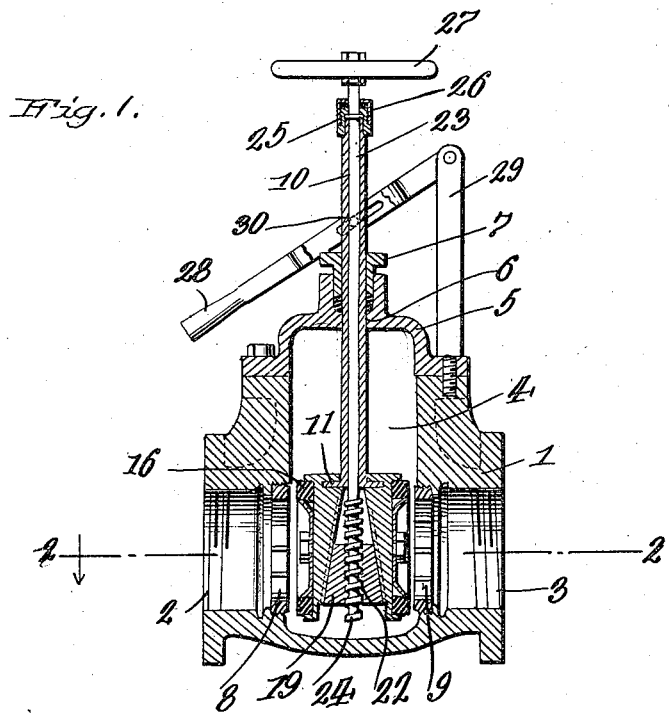
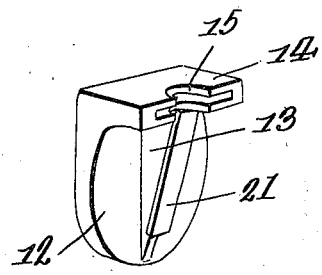
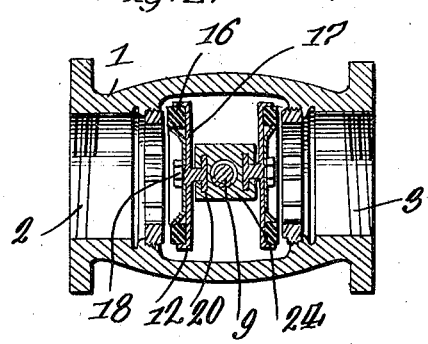
WITNESSES
INVENTOR
Edward H. Snyder,
BY
ATTORNEY

UNITED STATES PATENT OFFICE.

EDWARD H. SNYDER, OF PORT KENNEDY, PENNSYLVANIA.

VALVE.

1,250,041.   Specification of Letters Patent.   Patented Dec. 11, 1917.

Application filed April 2, 1917. Serial No. 159,294.

*To all whom it may concern:*

Be it known that I, EDWARD H. SNYDER, a citizen of the United States, residing at Port Kennedy, in the county of Montgomery and State of Pennsylvania, have invented certain new and useful Improvements in Valves, of which the following is a specification.

This invention relates to an improvement in valves and has for its main purpose the provision of a valve structure in which the parts are arranged to operate somewhat after the manner of a gate valve, the gate however being arranged so as to close straight against the seats, thus making it possible to use fiber or other packing disks.

A further object is to provide means by which the disks are closed against their seats and are positively locked and held in place against being opened even by excessive pressure within the pipe line connected on either side of the valve.

Yet another object is to provide means by which the closing disks can be moved to leave the inlet and outlet passages entirely open and unobstructed, when the disks are unseated from their closed position.

With the above and other objects in view, which will be in part described and in part understood from the specification, drawings and claims, my invention consists in certain novel features of construction and combinations of parts which will be hereinafter more fully set forth.

In the drawings:—

Figure 1 is a view in section through a valve constructed after the manner of my invention;

Fig. 2 is a sectional view taken on the line 2—2 of Fig. 1; and,

Fig. 3 is a perspective view showing one of the disk valve closing members.

The valve casing 1 has the inlet and outlet ports 2 and 3, and as the structure is such that the device is practically a two-way valve, the inlet passage might just as well be the outlet passage, and the reverse. A valve receiving chamber 4 is provided within the casing and opens through the upper side thereof, a cap 5 being provided to close the open end of this chamber, and the cap has a stem receiving opening 6 provided therethrough which is packed by means of a gland 7. The casing 1 has valve seats formed around the inner ends of the inlet and outlet passages 2 and 3, or the valve seat rings 8 and 9 might be provided therein. Where separate valve seat rings are mounted in the casing, it is perhaps preferable that these be of brass or some other material of a like nature which possesses considerable wear resisting qualities and thus adapts itself well for use in valve construction. A tubular stem 10 is fitted through the opening 6 of the cap 5 and is made of such length that it extends well down into the valve chamber 4 where it is provided with the outstanding flange 11.

Gates 12 are made in the form of disks with diagonal disposed ribs 13 on the back side thereof and flanges 14 provided at the upper edges, and these flanges 14 have grooves 15 provided therein for the reception of the outstanding flange 11 of the tubular stem 10. By the fitting of the flange 11 within the grooved out openings 15, the gate members 12, of which two are provided, are mounted on opposite sides of the stem and in proximity to the valve seat rings 8 and 9, it of course being understood that a loose fit is accomplished on the flanged portion 11 so that the gate disks can be moved to be set against and retracted from the faces of the rings 8 and 9, and such action as this is to be accomplished by means to be hereinafter more fully described. Each of the gate members 12 has a screw threaded stud extending from the face thereof and packing ring or disk receiving recesses are provided for reception of the packing rings or disks 16, plates 17 being provided to clamp the rings or disks in place and nuts 18 being fitted on the screw-threaded stud to tighten these clamp plates 17 into place, to securely and fixedly mount the packing rings or disks.

A gate spreader block 19, which is made substantially wedge-shaped is provided at its edges with the two slots or grooves 20, and the tapered or diagonal ribs 13 of the gate members 12 have outstanding side flanges 21 adapted to be received in the side branches of the T shaped slots or grooves 20 so that the two gate members may be mounted on opposite sides of the spreader block 19 and as the spreader block is moved in a vertical path these gate members will be separated or drawn together, as the block is moved vertically upwardly or downwardly. The spreader block 19 has a central screw threaded opening 22, and a stem 23 is extended down through the tubular opening of the stem 10 and at its lower end has a threaded portion 24 adapted to be received and turned within the threaded opening 22 of the spreader block. A collar 25 is provided around the stem 23 adjacent the upper end thereof and a combination packing and cap nut 26 is provided to be seated upon the upper end of the tubular stem 10 to establish a fluid-tight joint around the stem 23 and at the same time to hold this stem against movement endwise within the tubular stem 10. A hand wheel 27 is fixed on the upper end of the stem 23, and by turning this hand wheel, the threaded portion 24 will be turned through the threaded opening 22 of the spreader block 19 and consequently the spreader block will be raised or lowered as the case may be, the engagement of the flanges 21 within the side branches of the T shaped grooves 20 of the spreader block acting to cause these gate disks 12 to be either forced against the valve seat rings 8 and 9 to close access through the passages 2 and 3 or to be retracted toward each other to present a total width less than the inside dimension of the valve chamber 4. As has been stated, the tubular stem 10 is slidably mounted through the opening 6 of the cap 5 and a lever 28 is pivotally mounted on a post 29 carried by the casing 1 and has pins 30 extending laterally from the stem 10 received through slotted openings 31 provided therein. As the hand wheel 27 is turned to move the spreader block 19 downwardly to the position shown in Fig. 1 where the gate disks 12 are retracted from the closing position, clearance is provided between the disks and the walls of the valve chamber 4 and by swinging the lever 28 in an upward path, the stem 10 will be raised and in consequence the gate disks, the spreader block, and the other parts associated therewith will be moved up into the valve chamber 4 and the passage through the inlet and outlet openings will be left free and unrestricted. When the valve is to be again closed, the lever 28 will be swung downwardly to the position shown in Fig. 1 and then by turning the hand wheel 27 to draw the spreader block 19 upwardly, the two valve disks 12 will be spread and the packing disks or washer 16 thereof will seat against the rings 8 and 9 to positively seal and close the casing against inflow or outflow of fluid to either of the passages.

From the foregoing it will be seen that I have provided a valve which is constructed of comparatively few parts which are readily manufactured and assembled with facility, which valve structure is of such a character that gate disks can be positively closed against valve seats even under most severe pressure and will be locked against being unseated regardless of increase in the fluid pressure or reversal of the direction of flow and that at the same time the valve structure is of such character that it might be termed as being of the quick opening type, the parts being so constructed that the closing disks can be moved to a position to leave the inlet and outlet passages of the casing entirely open and unrestricted for the flow of a full volume of fluid through the valve.

While I have herein shown and described only one specific construction of casing, and certain rather limited adaptations and constructions of the remaining parts as fitted in conjunction with the casing, it will of course be understood that a number of changes and variations might be resorted to in the form and arrangement of parts as well as in the manner of assembling and operating the same without departing from the spirit and scope of my invention, and hence I wish to be limited only to such points as may be set forth in the claims.

I claim:—

1. A valve including a casing having inlet and outlet passages therein with a valve chamber intermediate said passages, a tubular stem slidably mounted in the casing extended into the valve chamber and provided with an outstanding flange, gate valve members mounted loosely on the flange and provided with tapered ribs having flanges extending laterally therefrom, a tapered spreader block provided with substantially T shaped grooves in which the ribbed and laterally extending flanges are fitted, said spreader block being provided with a screw threaded opening therethrough, a stem mounted through the tubular stem to be revoluble therethrough and provided with a screw threaded end received through the threaded opening of the spreader block, and a hand wheel provided on the outer end of said last mentioned stem by which the same may be turned to manipulate the spreader block to cause the valve disks to be closed over the inlet and outlet passages and to be unseated from this closed position according to the direction in which the hand wheel is turned.

2. A valve including a casing having inlet and outlet passages therein with a valve chamber intermediate said passages, a tubular stem slidably mounted in the casing extended into the valve chamber and provided with an outstanding flange, gate valve members mounted loosely on the flange and provided with tapered ribs having flanges extending laterally therefrom, a tapered spreader block provided with substantially T shaped grooves in which the ribbed and laterally extending flanges are fitted, said spreader block being provided with a screw threaded opening therethrough, a stem mounted through the tubular stem to be revoluble therethrough and provided with a screw threaded end received through the threaded opening of the spreader block, a hand wheel provided on the outer end of said last mentioned stem by which the same may be turned to manipulate the spreader block to cause the valve disks to be closed over the inlet and outlet passages and to be unseated from this closed position according to the direction in which the hand wheel is turned, packing disks carried by said valve disks, and means to hold the same secured in place to establish fluid tight joints at the inlet and outlet passages.

3. A valve including a casing having inlet and outlet passages therein with a valve chamber intermediate said passages, a tubular stem slidably mounted in the casing extended into the valve chamber and provided with an outstanding flange, gate valve members mounted loosely on the flange and provided with tapered ribs having flanges extending laterally therefrom, a tapered spreader block provided with substantially T shaped grooves in which the ribbed and laterally extending flanges are fitted, said spreader block being provided with a screw threaded opening therethrough, a stem mounted through the tubular stem to be revoluble therethrough and provided with a screw threaded end and received through the threaded opening of the spreader block, a hand wheel provided on the outer end of said last mentioned stem by which the same may be turned to manipulate the spreader block to cause the valve disks to be closed over the inlet and outlet passages and to be unseated from this closed position according to the direction in which the hand wheel is turned, a bracket carried by said casing, a lever swingingly mounted on said bracket, and a connection formed between said lever and the tubular stem to cause the stem and consequently the valve structure carried thereby to be raised as the lever is swung upwardly to thus leave the inlet and outlet passages free and unrestricted for the flow of fluid.

In testimony whereof I affix my signature in presence of two witnesses.

EDWARD H. SNYDER.

Witnesses:
RICHARD McNAMARA,
FRED REINAUER.